X52206
X57276

Aug. 6, 1968 C. R. ABBEY ETAL 3,396,240

DATA CHANNEL MONITOR

Filed Sept. 28, 1964

2 Sheets-Sheet 1

INVENTOR.
CHARLES R. ABBEY
HARRY H. PURSEL
DON L. SCIDMORE

Warren A. Sturm
ATTORNEY

INVENTOR.
CHARLES R. ABBEY
HARRY H. PURSEL
DON L. SCIDMORE
Warren A. Sturm
ATTORNEY United States Patent Office 3,396,240
Patented Aug. 6, 1968

3,396,240

DATA CHANNEL MONITOR

Charles R. Abbey, Harry H. Pursel, and Don L. Scidmore, Seattle, Wash., assignors to Honeywell Inc., a corporation of Delaware Filed Sept. 28, 1964, Ser. No. 399,683
10 Claims. (Cl. 178—69)

ABSTRACT OF THE DISCLOSURE

A monitor circuit for use in conjunction with a data handling system for monitoring a transmission link thereof to provide an indication of the operability of the transmission link. The system utilizes a coded signal in combination with the data and the coded signal is detected at the end of the transmission link by a synchronous type detection system which utilizes the same coded signal in its detection function.

This invention relates generally to data handling systems and is more particularly directed to a method and apparatus for monitoring the operation of a data handling system.

In a data handling system, for example telephone communication apparatus, the volume of traffic imposes an ever-increasing load on the equipment utilized. It is, therefore, necessary to maintain the highest possible efficiency and quality of transmission of data in such systems. There are at least two major factors which contribute to the efficient operation of data transmission equipment, the first being the status of each of the data handling channels that may be present in the equipment, i.e. continuity and occupancy, and second, quality of transmission, i.e. signal-to-noise ratio, frequency response and phase equalization.

Our invention provides a method and apparatus for continuously monitoring a channel in data handling systems whereby the status of a channel may be indicated to an observer and the quality of transmission may further be indicated to an observer or to automatic apparatus for correcting non-functioning or malfunctioning equipment embodied in the system and to provide a basis for the maximum utilization of all of the channels in the system.

It is therefore an object of our invention to provide a novel and improved method of monitoring a channel in a data handling system.

A further object of our invention is to provide novel and improved apparatus for monitoring a channel in a data handling system.

Another object of our invention is to provide improved apparatus for supplying a non-interfering monitor signal to a channel in data handling systems.

A still further object of our invention is to provide improved apparatus for supplying a monitor signal to a channel in data handling systems in which a pseudorandom code is utilized.

Another object of our invention is to provide channel monitoring apparatus in which a characterized monitor signal is transmitted through a channel in a data handling system and the signal is automatically detected at a receiving station.

A still further object of our invention is to provide improved signal receiving apparatus for detecting and tracking a characterized signal.

A further object of our invention is to provide a method of monitoring a data handling channel in data handling systems in which a continuous noise-like, non-interfering signal is transmitted and received on a data handling channel to provide an indication of the status of the channel and the quality of transmission.

These and other objects of our invention will become apparent from a consideration of the appended specification, claims, and drawing in which:

Figure 1:
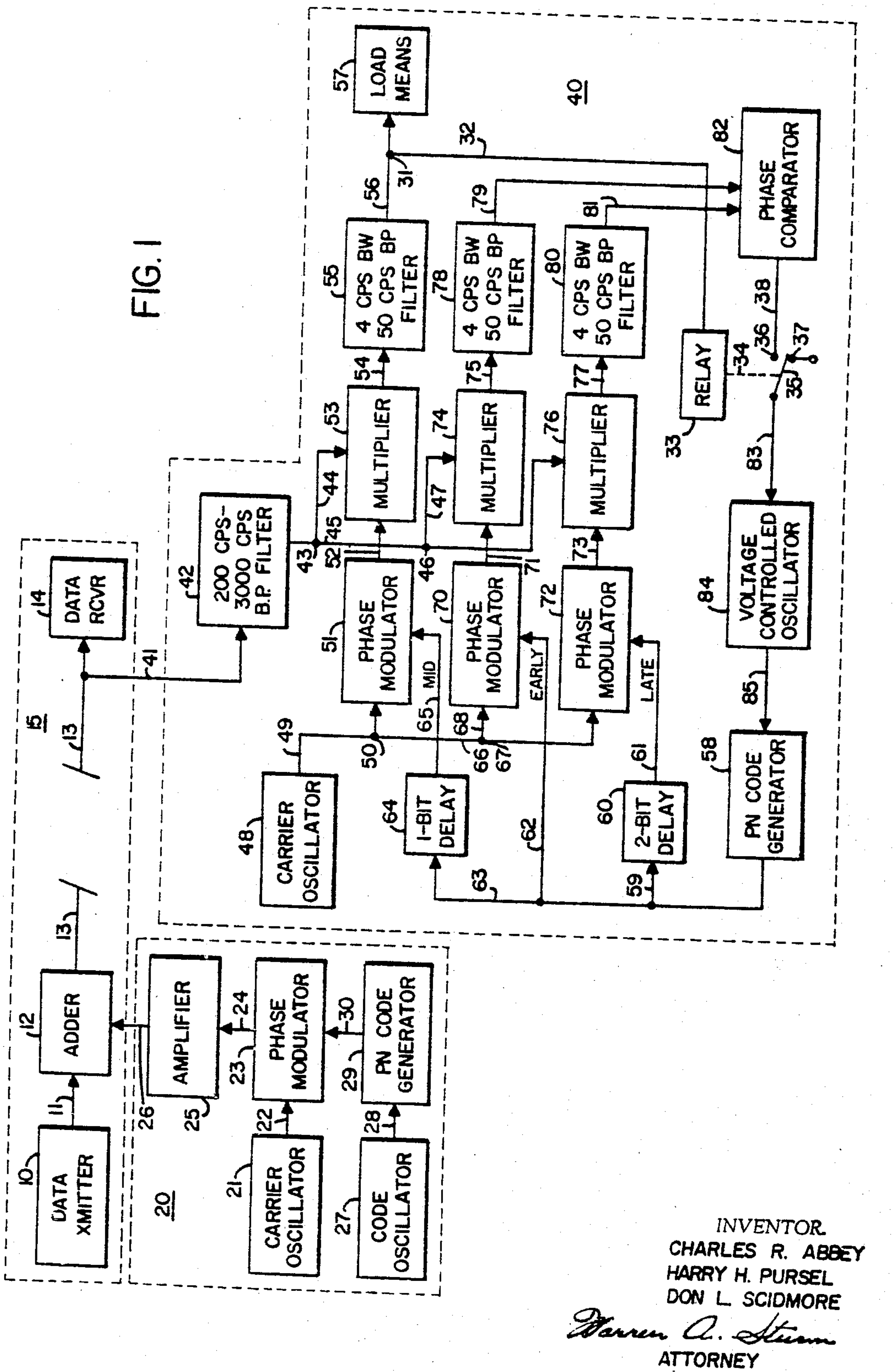
FIGURE 1 is a block diagram which includes a typical data handling system and one embodiment of our invention applied thereto.

Referring now to FIGURE 1 of the drawing, there is shown a data handling system indicated generally by reference character 15, a monitor transmitter indicated generally by reference character 20 and a monitor receiver indicated generally by reference character 40.

Data transmission system 15 is comprised of a data transmitter 10 which is connected to a data receiver 14 through a conductor 11, adder 12 and a data transmission link shown in the form of a conductor 13. The data handling system may conveniently be thought of as a voice telephone communication system in which conductors 11 and 13 may represent a plurality of channels extending intermediate two remotely disposed locations at which data transmitter 10 and data receiver 14 are positioned respectively. For the purpose of illustrating our invention, conductors 11 and 13 are to be considered as a single channel and it will be understood that our monitoring apparatus may be connected, for example, to each end of a plurality of channels in sequence, to determine the status of the channel and the quality of transmission of data signals therethrough.

Monitor transmitter 20 is shown comprised of a carrier oscillator 21, a signal balanced phase modulator shown as phase modulator 23, an amplifier 25, a code oscillator 27 operative in the illustrated embodiment at a frequency of 2000 bits per second and a pseudorandom code generator 29. Oscillator 27 is connected to code generator 29 through conductor 28 and code generator 29 is connected to phase modulator 23 through conductor 30. Carrier oscillator 21 is connected to phase modulator 23 through conductor 22 and the output of phase modulator 23 is connected to adder 12 in data transmission system 15 through amplifier 25 and conductor 26.

Carrier oscillator 21, which may be selected from the numerous examples of oscillator devices known to those skilled in the art, is designed to be operative in the illustrated embodiment, at a frequency of 1670 cycles per second and the output is applied to balanced phase modulator 23 as one input thereto. Code oscillator 27 will likewise be comprised of known oscillator devices which will provide an output of 2000 bits per second in the form of 0.1 millisecond pulses. One form of such apparatus may be comprised of a free-running multivibrator apparatus incorporating a one shot multivibrator. The pulses from code oscillator 27 are supplied to pseudorandom code generator 29 which may be of the general class of devices described in Error Correction Codes, W. W. Peterson, MIT Press and John Wiley & Sons, 1961. The ouput of pseudorandom code generator 29 may be comprised of a 127 bit pseudorandom digital code which is applied to a second input on phase modulator 23.

The output of phase modulator 23 appearing on conductor 24 is a characterized signal comprised of the 1670 c.p.s carrier that is phase modulated at a clock rate of 2000 bits per second supplied from code oscillator 27 and code generator 29. The period of the code may be seen to be 63.5 milliseconds where each of the 127 bits in the pseudorandom digital code is 0.5 millisecond. The output signal appears as a spread spectrum signal having characteristics similar to the background "noise" normally present in data handling systems. The signal is amplified to the desired level in amplifier 25 and connected to a channel 13, on a data handling system through a signal combining means shown as adder 12. It may be noted that the amplitude of the characterized "probe" signal from monitor transmitter 20 is preferably equal to or less than the normal "noise" present in a channel to be monitored. It may thus be seen that a periodic coded "probe" signal, which is non-interfering to the extent that "noise" is non-interfering with respect to the data signals present in the channel to be monitored, may be continuously applied in the manner shown in the drawing.

Monitor receiver 40 is comprised of an input filter 42, which is adapted to pass the band of frequencies present in the "probe" signal, a carrier oscillator 48 (having a nominal frequency of operation of 1620 c.p.s.), a pseudorandom code generator 58, three phase modulators 51, 70 and 72, three multipliers, 53, 74 and 76, three filters, 55, 78 and 80 (each having a four c.p.s. bandwidth at 50 c.p.s.), a load means 57, a phase comparator 82, a voltage controlled oscillator 84 (operable at a nominal frequency of 2002 bits per second) and a relay 33.

Carrier oscillator 48 is shown connected to phase modulators 51, 70 and 72 through conductors 49, terminal 50 and conductor 66 and terminal 67 and conductors 68 respectively. The output of pseudorandom code generator 58 is shown as being present on three conductors 59, 62 and 63. Conductor 63 is connected to an input on phase modulator 51 through 1-bit delay device 64 and conductor 65. Conductor 59 is connected to an input of phase modulator 72 through a 2-bit delay device 60 and conductor 61. As indicated on the drawing, the signals supplied at the input terminals of the several phase modulators are displaced one bit in time with respect to a mid-signal whereby the early and late code signals may bracket the mid-signal for purposes to be explained below in connection with the description of the tracking operation of monitor receiver 40.

Filter 42 is connected to conductor 13 through conductor 41. The output of filter 42 appears on conductor 45 and is connected to multiplier 53 through conductor 44, to multiplier 74 through terminal 43, conductor 45, terminal 46 and conductor 47 and to multiplier 76 through conductor 45. Multipliers 53, 74, and 76 are connected to the output of phase modulators 51, 70, and 72 through conductors 52, 71, and 73 respectively. The output of multiplier 53, appearing on conductor 54, is connected to a load means 57 through filter 55 and conductor 56 and to relay 33 through terminal 31 and conductor 32. The outputs of multipliers 74 and 76 are connected to phase comparator 82 through conductors 75 and 77, filters 78 and 80, and conductor 79 and 81 respectively. The output of phase comparator 82 is connected to voltage controlled oscillator 84 through conductor 38, stationary contact 36, movable contact 35 and conductor 83. Movable contact 35 is shown connected to relay 33 through driving means 34 for actuation in a manner to be described below. Stationary contact 37 is shown connected to a terminal adapted for connection to a suitable source of potential for establishing a predetermined "search" frequency for oscillator 84. The output of oscillator 84 is connected to an input on code generator 58 through conductor 85.

The monitor receiver is initially operable in a "search" mode with oscillator 84 connected to stationary contact 37 to provide a constant frequency of 2002 bits per second. The slight difference in frequency between code oscillator 27, as used to code the "probe" signal, and the voltage controlled oscillator 84, which is used to provide a code to detect the signal, presents an effective rotation of one signal with respect to the other for purposes to be explained below. This provides an operation analogous to a process of matching similar hole patterns in two, like, endless punched paper tapes by overlapping the tapes and sliding one with respect to the other until the corresponding holes in the patterns are aligned. The "search" mode is used because of the lack of a common time reference at both the monitor transmitter and receiver. It should also be noted that the carrier oscillators 21 and 48 in the monitor transmitter and receiver differ in frequency by 50 cycles which corresponds to the band pass of filters 55, 78 and 80. It may thus be seen that when a received "probe" signal and the signal generated in the receiver are in code synchronism, i.e., have reached maximum correlation, the output of multipliers 53, 74 and 76 will consist of a 50 c.p.s. sine wave.

As code coincidence, or correlation, is approached and as the "probe" signal and the locally generated code signal at the monitor receiver approach coincidence, the amount of 50 c.p.s. energy in the input to filter 55 increases and, because of the 4-cycle bandwidth, the output of filter 55 increases to a predetermined level to energize relay 33 through conductor 32 connected to terminal 31 on conductor 56. The energization of relay 33 positions movable contact 35 to provide a connection with stationary contact 36 to conductor 38. This serves to connect the output of phase comparator 82 to voltage controlled oscillator 84 to change the nominal frequency from 2002 to 2000 bits per second and a frequency of oscillator 84 will thereafter be controlled in accordance with the output of phase comparator 82 and the receiver will be operative in a "track" mode of operation.

Load means 57 may be operative to provide, for example, an indication of continuity in the channel and may also be provided with suitable means (not shown) for determining the signal to noise ratio in the channel under observation and to provide an indication of the quality of trasmission with regard to phase equalizations and channel frequency response.

Figure 3:
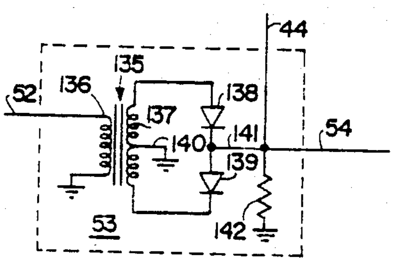
FIGURE 3 is an electrical schematic of an illustrative multiplier shown in block diagram on FIGURE 1.
Figure 2:
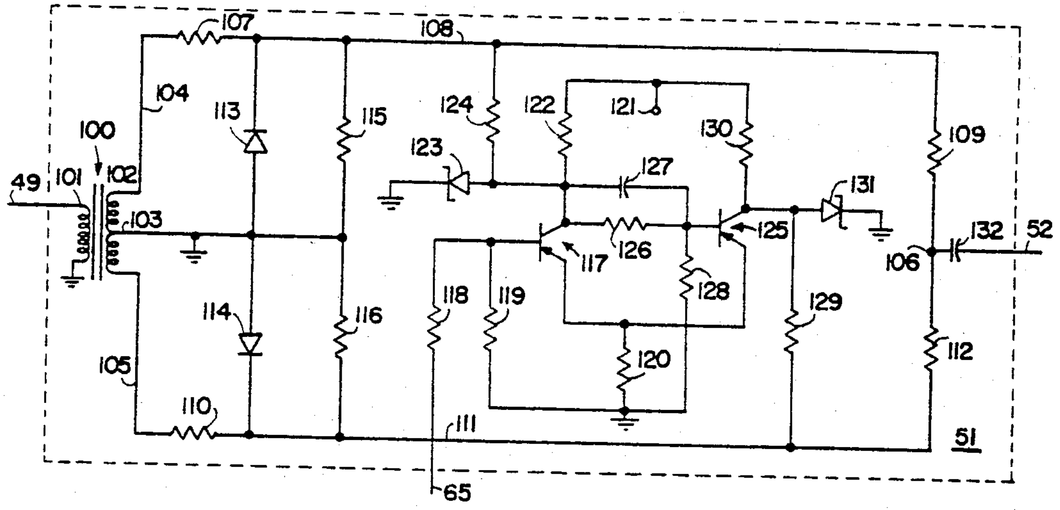
FIGURE 2 is an electrical schematic of an illustrative phase modulator shown in block diagram on FIGURE 1.
Figure 4:
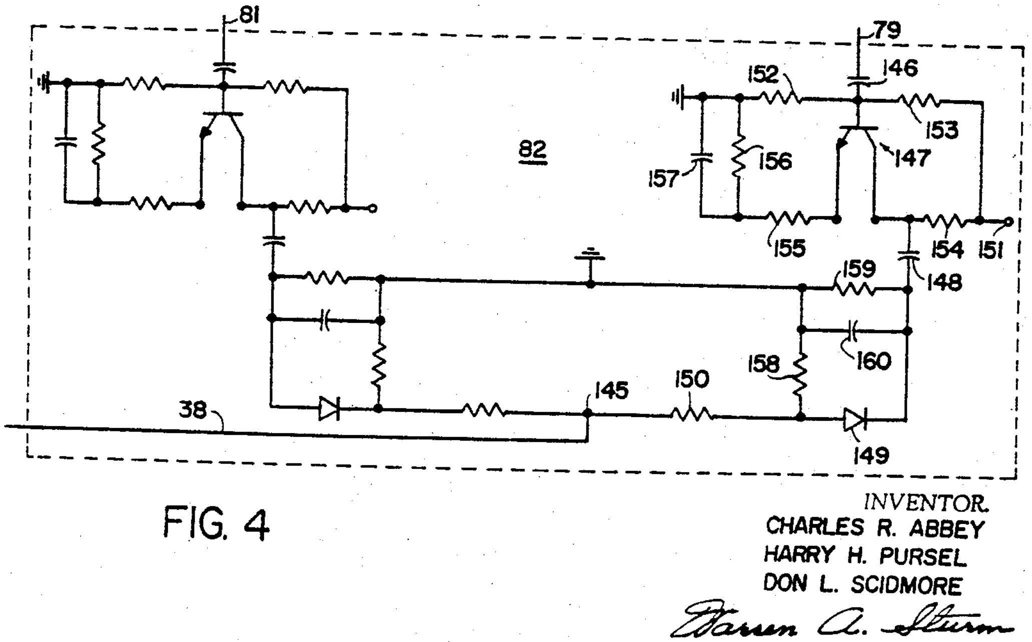
FIGURE 4 is an electrical schematic of an illustrative phase comparator shown in block diagram on FIGURE 1.

While the illustrative block diagrammatic showing of one embodiment of our invention is believed to be adequate to enable one skilled in the art with which our invention is concerned to readily practice the principles of our invention in the form of the illustrated embodiment or other embodiments which may become apparent, specific illustrative descriptions in the form of electrical schematic drawings are shown in FIGURES 2, 3 and 4 of several of the components utilized in the embodiment of FIGURE 1.

Referring to FIGURE 2, there is shown a balanced phase modulator 51, which may correspond to phase modulator 23 in monitor transmitter 20 and phase modulator 70 and 72 in monitor receiver 40. Phase modulator 51 is shown comprised of an input transformer 100 having a primary winding 101 connected to ground and to conductor 49 and secondary winding 102 connected to conductors 104 and 105 and a grounded center tap 103. Conductor 104 is connected to an output terminal 106 through resistor 107, conductor 108 and resistor 109. Conductor 105 is connected to output terminal 106 through resistor 110, conductor 111, and resistor 112. A pair of diodes, 113 and 114 are shown connected intermediate a ground terminal and conductors 108 and 111 respectively. Resistor 115 is shown connected in parallel with diode 113 and resistor 116 is shown connected in parallel with diode 114. A first transistor 117 is shown having its base electrode connected to conductor 65 through a resistor 118 and to a ground terminal through a resistor 119, its emitter electrode connected to ground through a resistor 120 and its collector electrode connected to a source of negative potential at terminal 121 through resistor 122. The collector electrode on transistor 117 is also connected to a ground terminal through a Zener diode 123 and to conductor 108 through resistor 124. A second transistor 125 is shown having its base electrode connected to the collector electrode of transistor 117 through resistor 126 having capacitor 127 in parallel therewith and to a ground terminal through resistor 128. The emitter electrode on transistor 125 is connected to a ground terminal through common resistor 120 and the collector electrode is connected to conductor 111 through resistor 129, terminal 121 through resistor 130 and to ground through Zener diode 131. Output terminal 106 is shown connected to conductor 52 through capacitor 132. The phase modulator shown schematically above may also be referred to as a balanced modulator and may be constructed of components according to the following table of values.

| Reference characters: | Values |
|---|---|
| 107 | ohms -- 4.7K |
| 109 | do ---- 1.5K |
| 110 | do ---- 4.7K |
| 112 | do ---- 1.5K |
| 113 | Type 1N198 diode |
| 114 | Type 19198 diode |
| 115 | ohms -- 470 |
| 116 | do ---- 470 |
| 117 | Type 2N526 transistor |
| 118 | ohms -- 2.2K |
| 119 | do ---- 4.7K |
| 120 | do ---- 100 |
| 122 | do ---- 2.2K |
| 123 | Type 1N759 Zener diode |
| 124 | ohms -- 4.7K |
| 125 | Type 2N526 transistor |
| 126 | ohms -- 43K |
| 127 | micromicrofarads -- 470 |
| 128 | ohms -- 33K |
| 129 | do ---- 4.7K |
| 130 | do ---- 2.2K |
| 131 | Type 1N759 Zener diode |
| 132 | microfarads -- 10 |

The amplitudes of the signals applied to conductors 49 and 65 comprising inputs of phase modulator 51 may easily be determined by those skilled in the art. The above described phase modulator was found to provide suitable operation when energized from a source of direct current power having its negative terminal connected to terminal 121.

Referring now to FIGURE 3, a typical multiplier corresponding to multipliers 53, 74 and 76 on FIGURE 1 is shown in schematic form. Multiplier 53 is shown comprised of a transformer 135 having a primary winding 136 that is connected intermediate a ground terminal and conductor 52, and a secondary winding 137, connected in series with a pair of like poled diodes 138 and 139 and having a center tap 140 connected to ground. The junction intermediate diodes 138 and 139 is connected to ground through conductor 141 and resistor 142. Conductor 141 is in turn connected to conductors 44 and 54. Conductor 52 connected to primary winding 136 is adapted to receive the coded signal appearing at the output of phase modulator 51 in receiver 40 and conductor 44 is adapted to supply the output from filter 42 in receiver 40 and the multiplicand of the two signals applied to conductors 52 and 44 appears on conductor 54. The values of the components utilized and the relative amplitude of the signals applied to multiplier 53 may easily be determined by those skilled in the art.

Referring now to FIGURE 4, a typical phase comparator as might be utilized in the illustrated embodiment of FIGURE 1 is shown in electrical schematic form. Briefly, phase comparator 82 may be operative to supply a substantially zero output voltage when the input voltages applied from conductors 79 and 81 connected to filters 78 and 80 respectively represent an output proportional to equal time deviation of the early and late locally generated code signals in receiver 40 from the "probe" signal. When the signal supplied from filter 55 to load means 57 is of a predetermined amplitude, it will be "bracketed" or "tracked" by the early and late locally generated code signals. Upon deviations from the desired "tracking" of the received signal, an output of one polarity or the other and of a magnitude dependent upon the extent of deviation from the desired "tracking" will be present at the output of phase comparator 82 which may be used to control the frequency of voltage controlled oscillator 84 to return to the desired "tracking" and maintain this relationship. In FIGURE 4, phase comparator 82 is shown having an output terminal 145 connected to conductor 38 and to conductors 79 and 81 through two separate and identical circuits, one of which will be described in detail below. Referring to the top portion of phase comparator 82, conductor 79 is shown connected to output terminal 145 through a capacitor 146, transistor 147, capacitor 148, diode 149, and resistor 150. Transistor 147 is shown having its base electrode connected to ground through resistor 152 and to power terminal 151 through resistor 153. The collector electrode on transistor 147 is connected to power electrode 151 through resistor 154 and to capacitor 148. The emitter electrode on transistor 147 is connected to a ground terminal through resistor 155 and resistor 156 having capacitor 157 in parallel therewith. Diode 149 is shown connected in parallel with series connected resistors 158 and 159. The junction of resistors 158 and 159 is connected to ground and capacitor 160 is shown connected in parallel with resistor 159. In one operative embodiment, terminal 151 was connected to a positive terminal of a source of direct current energy having a nominal value of 24 volts.

The following is a table of values for the several components shown in FIGURE 4 of the drawing:

| Reference characters: | Values |
|---|---|
| 146 | microfarads -- 50 |
| 147 | Type 2N335 transistor |
| 148 | microfarads -- 10 |
| 149 | Type 1N198 diode |
| 150 | ohms -- 56K |
| 152 | do ---- 6.2K |
| 153 | do ---- 47K |
| 154 | do ---- 6.2K |
| 155 | do ---- 39 |
| 156 | do ---- 1.2K |
| 157 | microfarads -- 100 |
| 158 | ohms -- 62K |
| 159 | do ---- 62K |
| 160 | microfarad -- 0.1 |

It is to be understood that other modifications and embodiments of our invention will become apparent to those skilled in the art upon becoming familiar with the principles of our invention as described in the embodiment illustrated above and that the scope of our invention is to be governed solely by the appended claims.

We claim:

1. In combination with a data handling system, monitoring apparatus comprising, in combination:
   (1) signal transmitting means adapted to be connected to a data handling system, said means being adapted to provide a first characterized non-interfering signal of an amplitude similar to that of noise;
   (2) signal receiving means adapted to be connected to a data handling system, said receiving means including means for decharacterizing said first signal comprising,
      variable frequency means for generating a second signal having characteristics substantially identical to said first signal, and
      correlation means for receiving said first and second signals and connected to said variable frequency means for adjusting the frequency thereof to improve the correlation between said first and second signals; and
   (3) indicating means connected to said correlation means of said receiving means.

2. The apparatus of claim 1 in which the characterized signal is of a pseudorandom nature.

3. The apparatus of claim 1 in which the transmitter and receiver are continuously operable.

4. The apparatus of claim 1 in which the indicating means is operable to indicate characterization synchronism between said first and second signals.

5. The apparatus of claim 4 in which the signals are characterized in accordance with a pseudorandom code.

6. In apparatus of the class above described, in combination with a source of characterized signal, characterized signal detecting means comprising, in combination:

(1) first and second sources of signal having a predetermined characterization corresponding to a signal to be detected, said first and second sources of signal having a nominal frequency substantially equal to said signal to be detected and differing in frequency by a predetermined amount;

(2) first signal combining means connected to said signal to be detected and said first source of signal;

(3) second signal combining means connected to said signal to be detected and to said second source of signal;

(4) comparing means connected to said first and second signal combining means, operable to provide a further signal indicative of the outputs of said signal combining means; and (5) means, connected to said comparing means, for varying the frequency of said first and second sources of signal in accordance with the output of said comparing means.

7. Monitoring apparatus for use with a transmitter-receiver data link for providing an indication that the data link is operable comprising, in combination:

first signal generating means for generating a first coded signal having pseudorandom characteristics of a given frequency and operating in circuit with the transmitter;

second signal generating means for generating a variable frequency second coded signal having the same pseudorandom characteristics as said first coded signal and operating in circuit with the receiver;

correlation means operating in circuit with the receiver and connected to said second generating means for providing outputs indicative of the correlation; and feedback means connected to receive an output of said correlation means and connected to said second generating means for varying the frequency thereof to maximize the correlation of said first and second signals.

8. Apparatus as claimed in claim 7 wherein the first coded signal as received have substantially the same amplitude as noise.

9. Apparatus as claimed in claim 7 wherein:

said correlation means comprises first, second and third channels each connected to receive said first and second signals, said first and third channels including one and two bit delays respectively in an input for receiving said second coded signal; and said feedback means compares outputs of said second and third channels in controlling the frequency of said second generating means.

10. Apparatus as claimed in claim 9 wherein each of said channels includes a phase modulator, a multiplier and a narrow bandpass filter.

References Cited

UNITED STATES PATENTS

| | | | |
|---|---|---|---|
| 2,924,703 | 2/1960 | Sichak et al. | 325—31 |
| 2,963,549 | 12/1960 | Christopherson | 178—69 |
| 2,967,908 | 1/1961 | Gray et al. | 178—69 |

THOMAS A. ROBINSON, *Primary Examiner.*